(12) United States Patent
Richardson et al.

(10) Patent No.: US 7,801,670 B2
(45) Date of Patent: Sep. 21, 2010

(54) TEMPORARY SUSPENSION OF OXYGEN SENSOR MONITORING DURING BRAKING OPERATIONS

(75) Inventors: Peter Richardson, Coventry (GB); Kenichi Fujiki, Toyoaki (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 11/976,607

(22) Filed: Oct. 25, 2007

(65) Prior Publication Data

US 2009/0112446 A1 Apr. 30, 2009

(51) Int. Cl.
*F02D 41/00* (2006.01)

(52) U.S. Cl. .................. 701/109; 701/114; 123/688; 73/114.69; 73/114.71; 73/114.72; 73/114.73

(58) Field of Classification Search ................. 123/690, 123/679, 682, 688, 703, 198 D, 674; 701/101, 701/102, 109, 114; 73/1.06, 23, 32, 114.69–114.73, 73/114.77; 477/199, 200, 202; 60/277
See application file for complete search history.

(56) References Cited

U.S. PATENT DOCUMENTS

| 5,245,979 A * | 9/1993 | Pursifull et al. ............. 123/690 |
| 7,599,786 B2 * | 10/2009 | Utsumi et al. ............... 701/112 |
| 2003/0159432 A1 * | 8/2003 | Kobayashi et al. ........... 60/274 |

FOREIGN PATENT DOCUMENTS

JP 2006-322426 11/2006

* cited by examiner

*Primary Examiner*—Stephen K Cronin
*Assistant Examiner*—Raza Najmuddin
(74) *Attorney, Agent, or Firm*—Nixon & Vanderhye, PC

(57) ABSTRACT

To avoid potentially erroneous results, monitoring the operation of an oxygen sensor of an internal combustion engine of a motor vehicle to detect a slow response of the oxygen sensor as indicative of an oxygen sensor fault is temporarily suspended in response to a brake operation transition of a braking system of the vehicle.

23 Claims, 9 Drawing Sheets

TEMPORARY SUSPENSION OF OXYGEN SENSOR MONITORING DURING BRAKING OPERATIONS

BACKGROUND

1. Field of the Invention

This invention relates to exhaust gas oxygen sensor fault monitoring for an internal combustion engine of a motor vehicle.

2. Related Art

As emissions requirements become more stringent, it becomes more important to ensure that sensors that are used in the control of an internal combustion engine are working correctly. In the case of an oxygen sensor, for example a universal heated exhaust gas oxygen (UHEGO) sensor as used in an exhaust system of an internal combustion engine, a diagnostic monitor is typically provided to check for a potentially slow response of the oxygen sensor as indicative of a sensor fault. An example of such a diagnostic monitor can operate by monitoring the average sensor output against an average air-fuel ratio (AFR) control feedback amplitude over a set period of time and by applying a forced fuel dither to the normal AFR control to check for a slow oxygen sensor response.

However, it is also important to ensure that such monitoring accurately reflects the true performance of the oxygen sensor, for example to avoid, wherever possible, false reporting of apparent sensor faults when the sensor is in fact operating correctly.

An aim of the present invention is to reduce potential false reporting of potential sensor malfunctions.

SUMMARY

An aspect of the invention can provide a sensor malfunction monitor operable to monitor the response of an oxygen sensor of an internal combustion engine of a motor vehicle to detect a slow response of the oxygen sensor as indicative of an oxygen sensor fault. The sensor malfunction monitor can include entry condition logic operable temporarily to suspend the oxygen sensor response monitoring in response to a brake operation transition of a braking system of the vehicle.

By suspending oxygen sensor response monitoring when a brake operation transition, or transient, occurs, the risk of erroneous monitor results and cases of false flagging of potential oxygen sensor faults can be reduced.

The entry condition logic can include a brake signal transition detector logic responsive to a transition in a brake signal as indicative of a transient brake operation, for example of brake activation and brake deactivation. The entry condition logic can include timing logic responsive to the brake signal transition detector logic and operable to cause the oxygen sensor response monitoring to be suspended for a predetermined time in response to detecting a brake operation transition of the braking system of the vehicle.

Various aspects of the invention include an engine management system for an internal combustion engine of a motor vehicle that is provided with such a sensor malfunction monitor. An internal combustion engine system can be provided with such an engine management system. A vehicle comprising an internal combustion engine, an exhaust system, an oxygen sensor in the exhaust system and a braking system, can include such a sensor malfunction monitor, which sensor malfunction monitor can form part of the engine management system for the vehicle.

An aspect of the invention can also provide a method of monitoring the operation of an oxygen sensor of an internal combustion engine of a motor vehicle to detect a slow response of the oxygen sensor as indicative of an oxygen sensor fault, the method comprising temporarily suspending the oxygen sensor response monitoring in response to a brake operation transition of a braking system of the vehicle.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying drawings.

Figure 1:
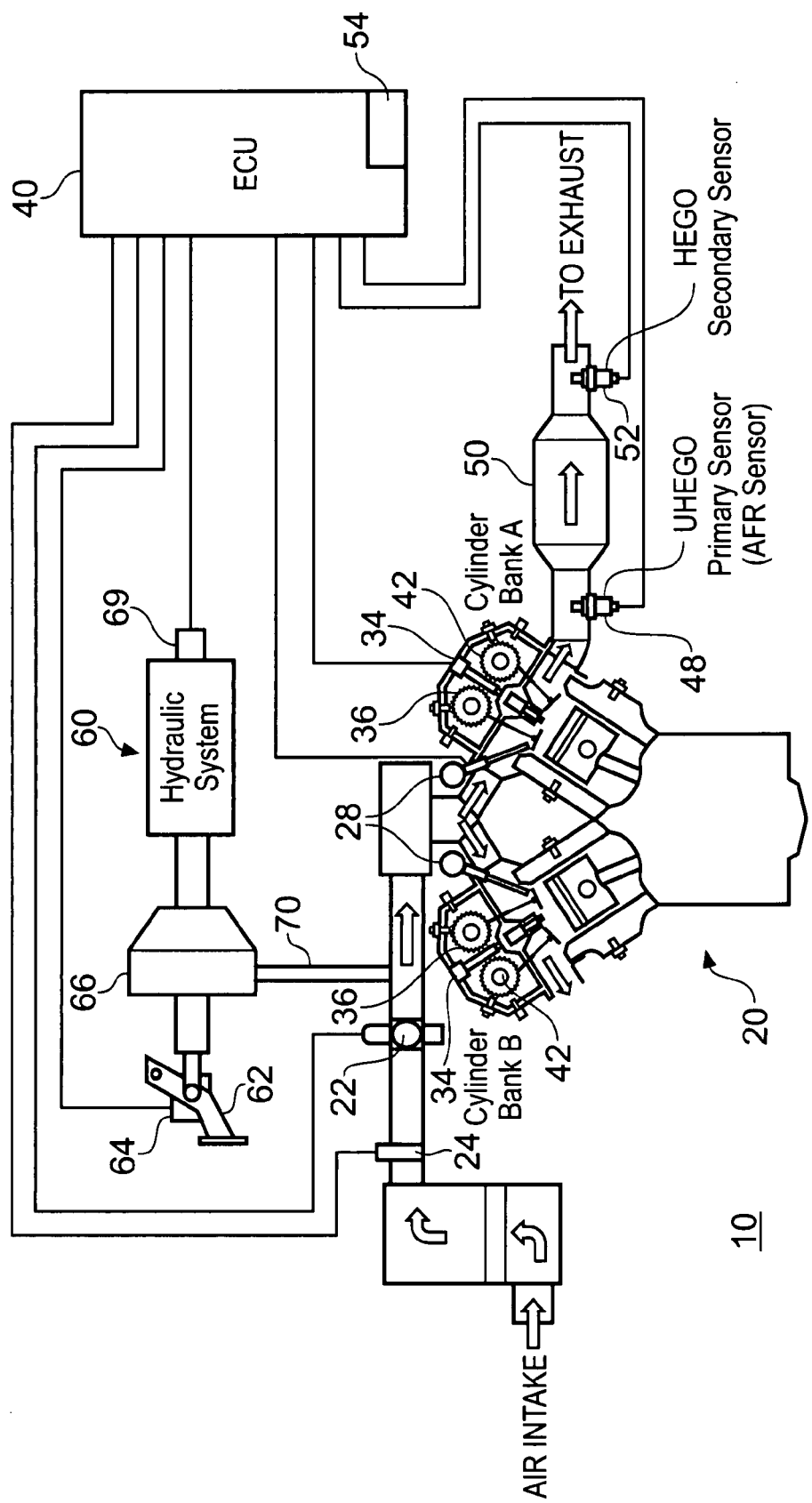
FIG. 1 is a schematic block diagram of an example of an internal combustion engine according to the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An embodiment of the invention can be operable to provide monitoring the response of an oxygen sensor of an internal combustion engine of a motor vehicle to detect a slow response of the oxygen sensor as indicative of an oxygen sensor fault but temporarily to suspend the oxygen sensor response monitoring in response to a brake operation transition of a braking system of the vehicle. This can reduce the risk of potentially flagging normal sensor operation as faulty operation.

FIG. 1 provides a schematic overview (partly in cross section) of an engine system 10 including an internal combustion engine 20. The internal combustion engine 20, represented schematically in cross section in FIG. 1, is a V configuration gasoline engine. In one example, the engine comprises two banks, each of four cylinders. However, in other examples the internal combustion engine could comprise another number of cylinders, and/or could have another configuration, for example an in-line configuration, or a boxer configuration, by way of examples only.

The engine system 10 is controlled by an engine control unit (ECU) 40 which is connected to various sensors and control subsystems of the engine system 10. The ECU controls the operation of a throttle 22 at the intake side of the engine. A mass airflow sensor 24 in the air intake provides control signals to the ECU 40. A fuel injector 28 for each cylinder is connected to a fuel supply line (not shown). The individual injectors 28 receive control signals from the ECU 40 to control the timed injection of fuel. Spark plugs 34 receive ignition timing (IGT) signals from the ECU 40.

The intake and exhaust camshafts 36 and 42 respectively control intake and exhaust valves. The engine control unit receives signals from various sensors (not specifically identified) in a conventional manner such that the engine control unit is able to monitor operating parameters such as engine speed, engine load, etc. The engine control unit 40 also receives control signals from a universal heated exhaust gas oxygen (UHEGO) sensor 48 and a heated exhaust gas oxygen (HEGO) sensor 52. In the example shown the UHEGO sensor and the HEGO sensor are located either side of a catalytic converter 50, downstream of the exhaust manifold. However, in other examples the positioning of UHEGO sensor 48 and/or the HEGO sensor 52 could be different. In the present example, the engine control unit 40 includes oxygen sensor monitor logic 54 that is described in more detail with respect to FIGS. 2 to 8.

FIG. 1 also illustrates schematically, elements of a vehicle braking system 60. Illustrated in FIG. 1 are a brake pedal 62, which is provided with a brake switch 64 that supplies a signal to the engine control unit 40 indicative of whether the brake pedal is pressed (activate) or is not pressed (inactive). The brake pedal acts 62 on a brake booster 66 that in turn acts on a hydraulic system 68 for activating the vehicle brakes in response to pressing the brake pedal. The ECU is able to monitor brake pressure by means of a brake pressure sensor 69. The brake booster 66 acts to boost the brake pressure applied to the brake pedal 62 by the driver using a difference between atmospheric pressure and the low pressure experienced in the intake manifold of the internal combustion engine. In an example of such a brake booster 66, (sometimes known as a vacuum brake booster), one side of a diaphragm in the brake booster is exposed to atmospheric pressure and a cavity on the other side of the diaphragm is connected to the intake manifold via a connecting pipe 70. The brake pedal 62 is located on the same side of the diaphragm as the side exposed to atmospheric pressure.

Figure 2:
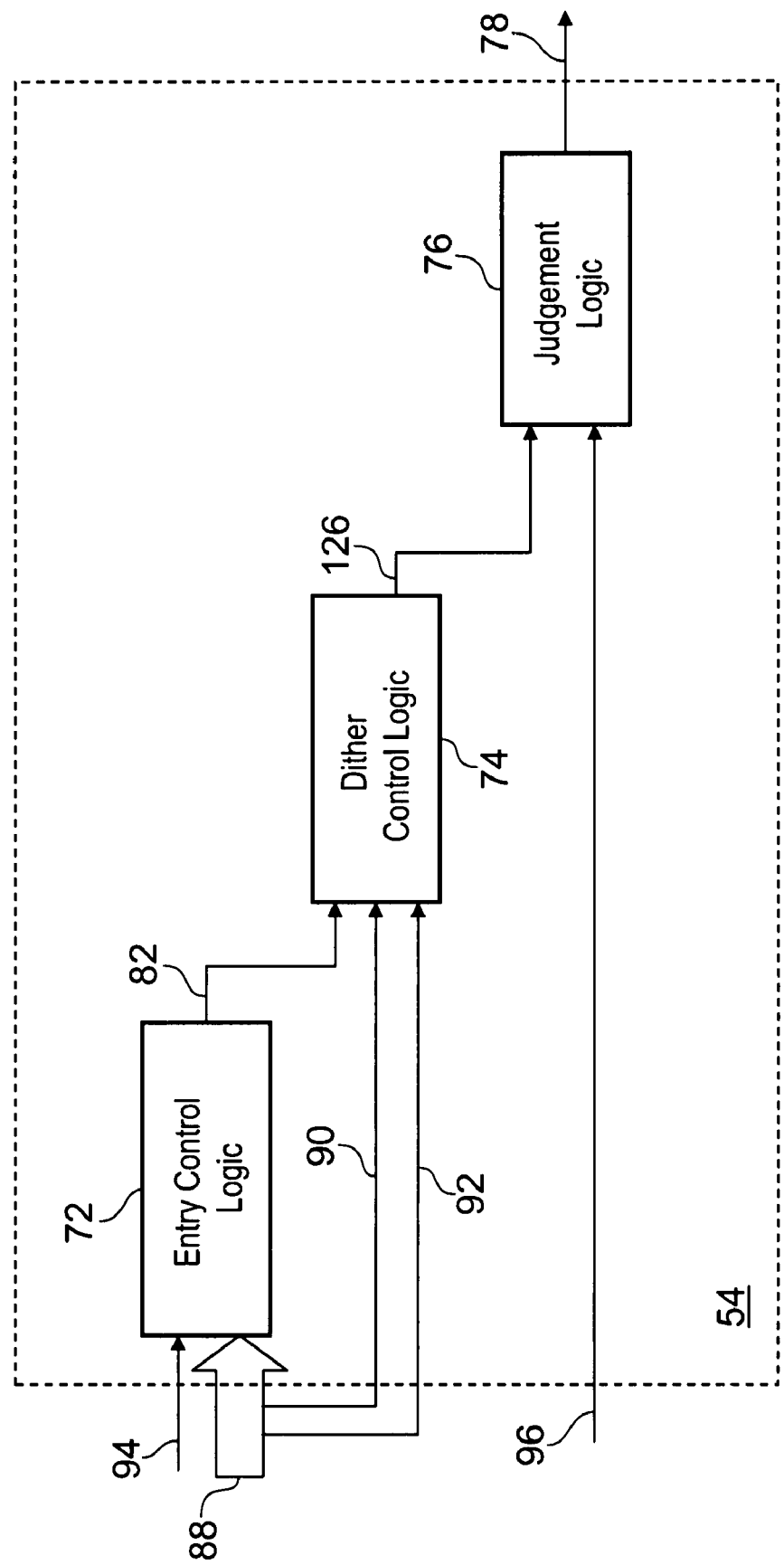
FIG. 2 is a block diagram of an example oxygen sensor monitor that forms part of an engine control unit for an example of embodiment of the invention.

FIG. 2 is a schematic overview of an example oxygen sensor monitor logic 54. The aim of the oxygen sensor monitor logic 54 is to detect an oxygen sensor malfunction that presents itself as a slow response to an applied forced dither to an air-fuel ratio (AFR) feedback control.

The example oxygen sensor monitor logic 54 can form part of the engine control unit 40, as illustrated in FIG. 1. However, the oxygen sensor monitor logic could be provided as a unit separate from the engine control unit 54.

As illustrated in FIG. 2, the example oxygen sensor monitor logic 54 includes entry control logic (ECL) 72, dither control logic (DCL) 74 and judgment logic 76. The entry control logic 72 receives various signals including a brake signal 94 and other entry condition signals 88. The other entry condition signals can include, for example, an engine speed value 90 and an air flow value 92, both of which are provided to the dither control logic 74. The entry control logic 72 provides a monitor enable signal 82 to the dither control logic 74. The dither control logic 74 provides an AFR control signal to the judgment logic 76. The judgment logic also receives a lambda signal 96 from an oxygen sensor to be monitored, and outputs a control signal 78 representative of a judgment of the oxygen sensor operation. The functions of these various component logical units 72, 74, and 76 are described in more detail in the following.

Figure 3:
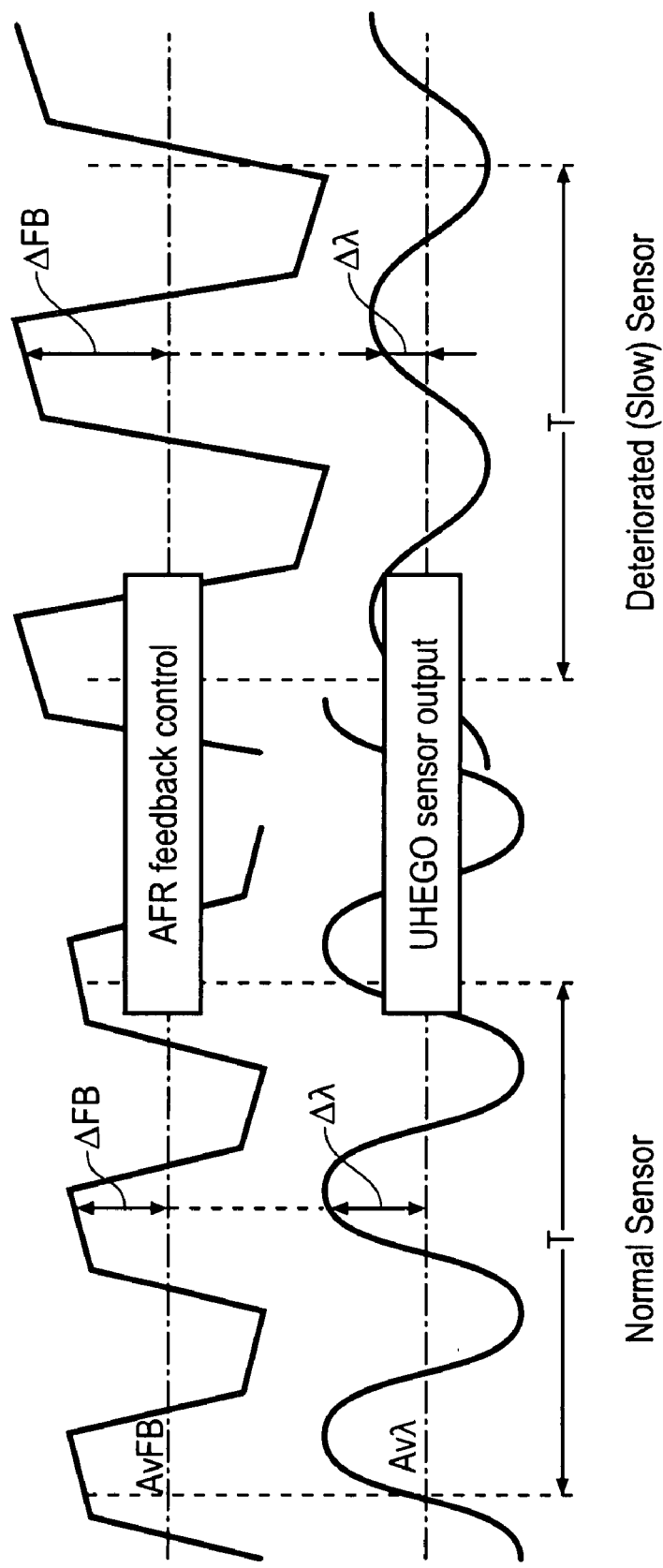
FIG. 3 illustrates the use of AFR feedback control to provide for UHEGO sensor monitoring.

The example oxygen sensor monitor logic 54 is operable to monitor the average oxygen sensor output (e.g. the average UHEGO sensor output) against an average Air-Fuel Ratio (AFR) control feedback amplitude over a set period of time and to check for a slow response to an applied forced fuel dither to the normal AFR control as indicative of a potentially faulty oxygen sensor. This is represented in FIG. 3. The top left trace in FIG. 3 represents the AFR feedback control signal, and the bottom trace represents the oxygen sensor output.

The left hand side of FIG. 3 represents normal operation of the oxygen sensor, whereby a judgment of normal operation would be made where the sum of a set of results for the change in the lambda values from the oxygen sensor divided by the change in feedback amplitude over a predetermined time is greater than or equal to a threshold value, that is:

$$\sum \frac{\Delta \lambda / \Delta FB}{T} \geq Thesholdvalue$$

The right hand side of FIG. 3 represents deteriorated (or slow) response of the oxygen sensor, whereby a judgment of deteriorated operation would be made where the sum of a set of results for the change in the lambda values output by the oxygen sensor divided by the change in feedback amplitude over a predetermined time is less than the threshold value:

$$\sum \frac{\Delta \lambda / \Delta FB}{T} < Thesholdvalue$$

As the judgments referred to above with reference to FIG. 3 are determined over time, a potentially incorrect judgment may be made where a transient condition in engine operation occurs.

As indicated above, a brake booster 66 can work by using the low pressure at the intake manifold to apply low pressure to one side of the diaphragm in the brake booster 66. The low pressure on one side of the diaphragm enables atmospheric pressure at the other side of the diaphragm to boost the force applied to the brake pedal 62 by the driver of a vehicle.

It has been determined that a potentially incorrect oxygen sensor judgment may be made where a transient in braking operation occurs. It has been determined that as a result of the vacuum brake booster function described above, transients in braking can cause fluctuations in intake manifold pressure, which in turn can cause transient fuelling changes. These transients in fuelling can affect changes in the lambda values that would be detected by the oxygen sensors and as a result, that oxygen sensor response monitoring may be unreliable at such a time.

Accordingly, in accordance with an example embodiment of the invention, to avoid potentially false judgments being made during a period of brake transients, the oxygen sensor response monitoring is suspended in response to brake operation transients. An embodiment of the invention includes entry control logic operable to cause the temporary suspension of oxygen sensor response monitoring.

Figure 4:
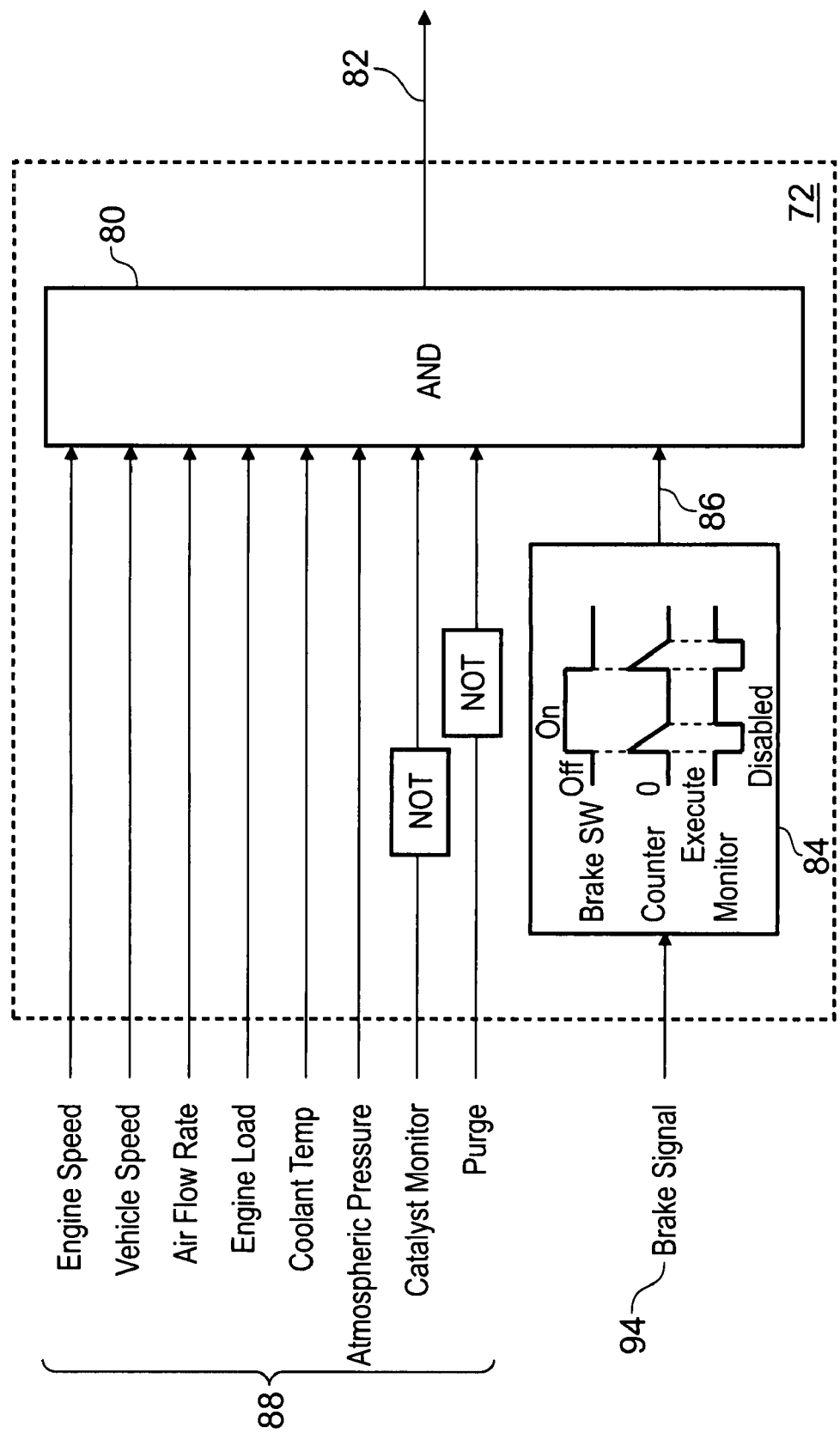
FIG. 4 is a schematic block diagram of example entry control logic.

In this regard, FIG. 4 is a schematic representation of an example embodiment of entry control logic 72 shown in FIG. 2.

FIG. 4 represents an AND function 80 that is operable to provide a monitor enable signal 82 when certain entry conditions are met. In an example embodiment of the invention, an entry condition is that brake signal transition logic 84 is providing a monitor permission signal 86 indicative that the oxygen sensor response monitoring may be enabled.

As illustrated in FIG. 4, one or more other entry conditions 88 can be specified, for example one or more conditions that: engine speed is within a predetermined range of values, vehicle speed is within a predetermined range of values, an air flow rate to the engine is within a predetermined range of values, an engine load to the engine is within a predetermined range of values, a coolant temperature is within a predetermined range of values, atmospheric pressure is within a predetermined range of values, catalyst operation is normal and an engine purge valve is not operating.

In operation, the brake signal transition logic 84 is responsive to a brake signal 94. The brake signal 94 can have a first state (ON) when the braking system of the vehicle is active, and a second value (OFF) when the braking system of the vehicle is brake is inactive. In the present example, the brake signal 94 can be generated, for example, in response to the state of the brake switch 64 illustrated in FIG. 1. In another example, it could be dependent on, or generated in response to, a brake fluid pressure signal from the brake pressure sensor 69. Accordingly, although in the present example the brake signal 94 is a signal that just has two states (on and off), in another example it could be an analogue or digital signal that varies accordingly to a brake pressure.

The brake signal transition logic can include a timer (e.g., a counter) that is set in response to detection of a brake signal transition and times a time period during which the permission signal 86 is to be disabled. After the timed period triggered by the brake signal transition, the permission signal 86 is once more enabled.

Figure 5:
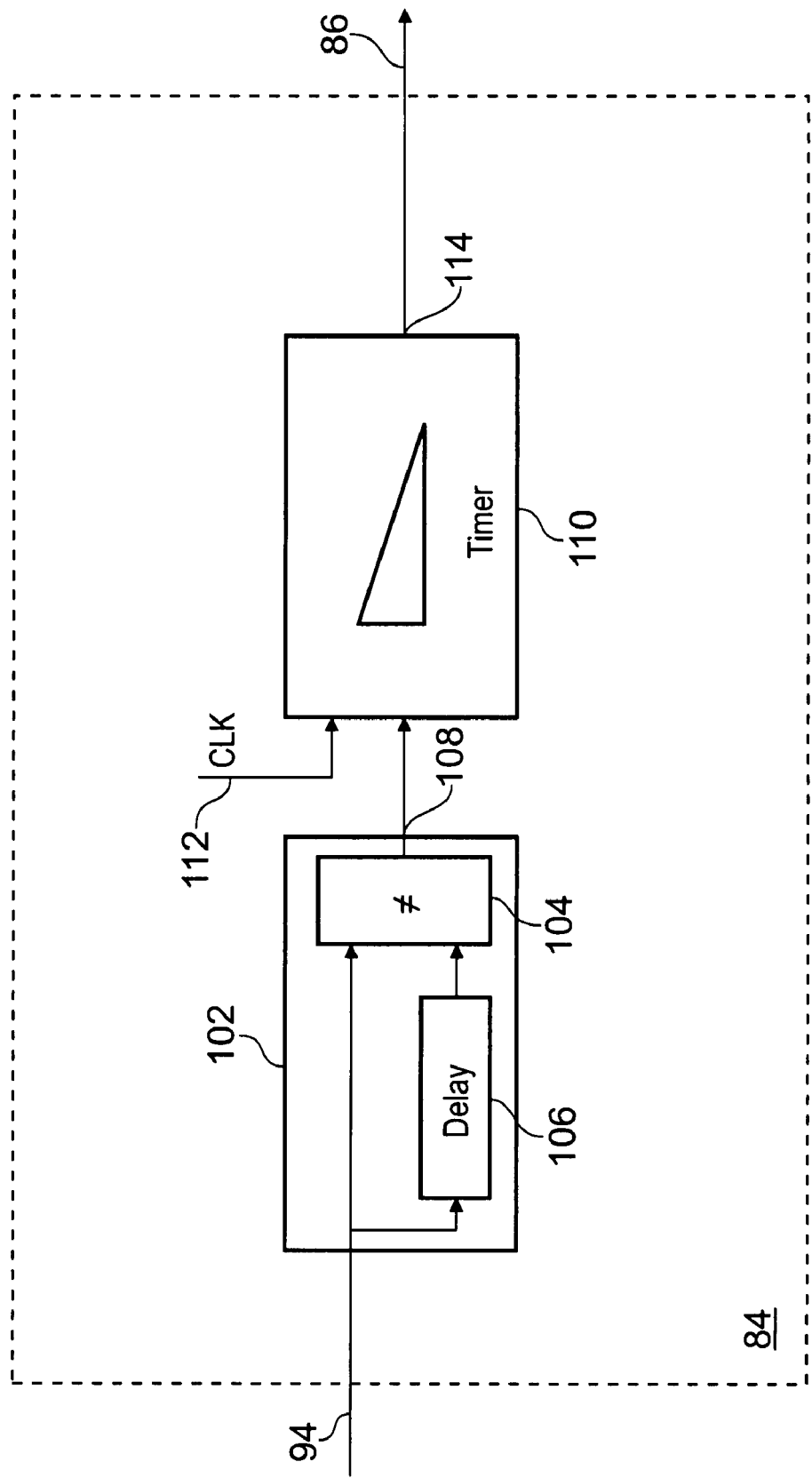
FIG. 5 is a schematic block diagram of part of the entry control logic of FIG. 4.

FIG. 5 illustrates example embodiment of brake signal transition logic 84 in more detail. In the example shown, a brake signal transition detector 102 comprises a comparator 104 that compares a current value of the brake signal 90 to a value of the brake signal delayed in delay logic 106 to determine whether a difference between the level of the two signal values is sufficient (e.g. exceeds a predetermined threshold) to indicate a change in state of the brake signal 94 indicative of a brake transition event (e.g. applying or releasing the brake pedal).

Where the comparator detects a difference, this causes the brake signal transition detector 102 to output a signal at 108 that acts to set a timer 110 to time a time period during which sensor response monitoring is to be suspended. In the present instance the timer 110 is a count down counter that is set to a start value by signal 108 and then counts down to zero in response to a clock signal 112. It will be appreciated that although in the present instance a particular form of counter is illustrated, in another example any suitable counter or timer could be used to time the period 76. In the example shown, the timer 110 outputs, at 114, a first value (e.g. 1) when the count is at zero, and outputs a second value (e.g., 0) when the counter is timing during counting down. The values output at 114 form the monitor permission signal 86 indicative that the oxygen sensor response monitoring may be enabled when the timer 110 is idle (e.g., not counting), and that the oxygen sensor response monitoring should be suspended during the timed interval following a brake transition event.

It should be noted at this point that although the brake signal transition logic 84 described above is arranged to time a predetermined interval following a brake transition event in which oxygen sensor response monitoring is to be suspended, in another example, the brake signal transition logic 84 could be configured to be responsive to changes in brake pressure to determine when to suspend oxygen sensor response monitoring (e.g. when there is a rapid change in brake pressure), rather than, or in addition to, providing a predetermined time period.

As described with reference to FIG. 4, the AND function 80 is operable to provide a monitor enable signal 82 when the entry conditions are met, and not to provide the monitor enable signal 82 when the entry conditions are not met. Accordingly, in an example embodiment of the invention, if the brake signal transition logic 84 does not output a monitor permission signal 86 indicative that the oxygen sensor response monitoring may be enabled, the monitor enable signal 82 will have a state that indicates that the entry conditions are not met and oxygen sensor response monitoring is suspended. Also, in an example embodiment of the invention, if the brake signal transition logic 84 outputs a monitor permission signal 86 indicative that the oxygen sensor response monitoring may be enabled and any other entry conditions are met (where applicable), the monitor enable signal 82 will have a state that indicates that the entry conditions are met and oxygen sensor response monitoring may be performed.

Figure 6:
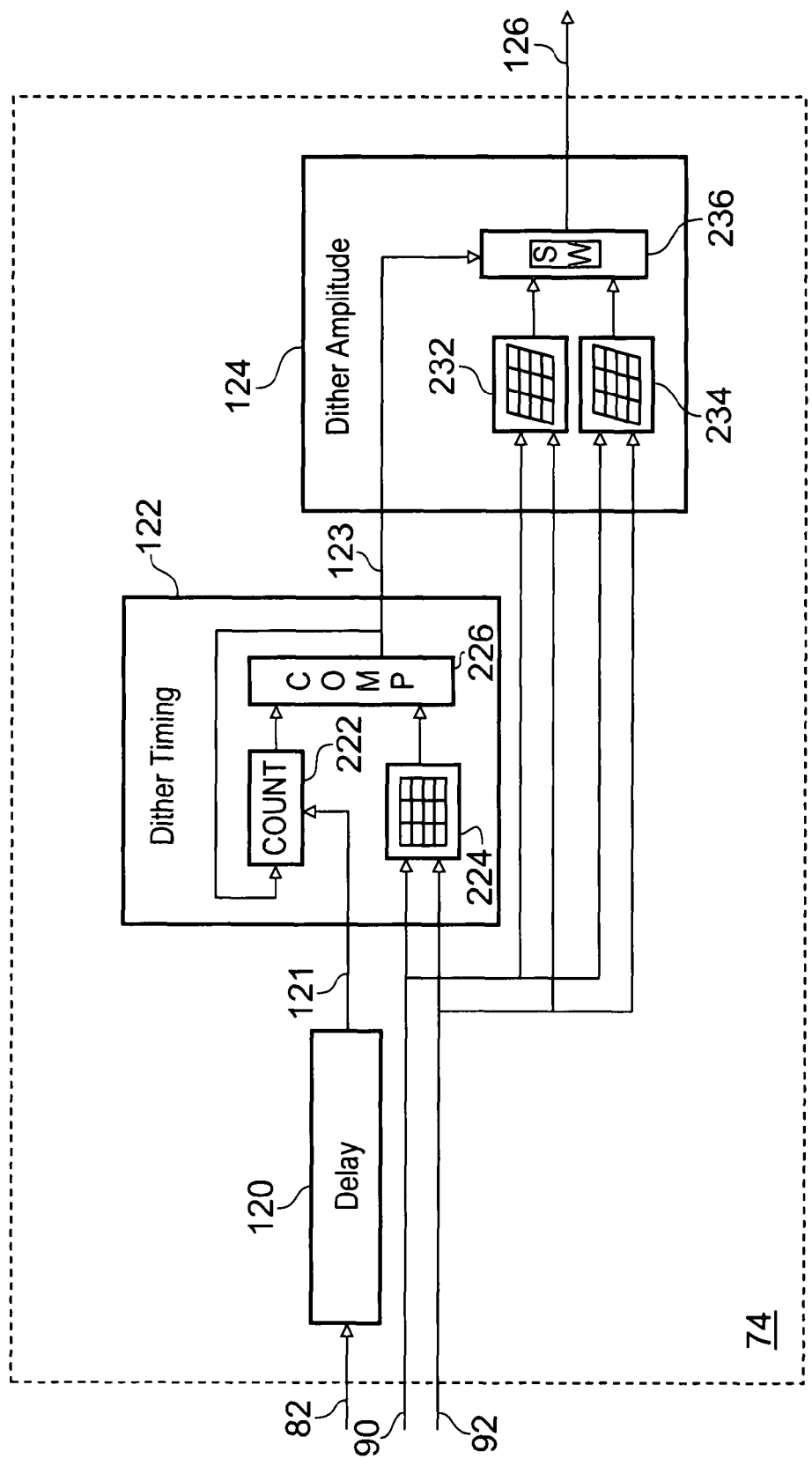
FIG. 6 is a schematic block diagram of example dither control logic.

FIG. 6 illustrates example dither control logic 74. The dither control logic is operable to apply a fuel dither that varies between rich and lean to enable testing of the oxygen sensor output as described with reference to FIG. 2.

The example of the dither control logic 74 shown in FIG. 6 includes dither delay logic 120 that is responsive to the monitor enable signal 82. The dither delay logic 120 is responsive to the monitor enable logic changing state to indicate that oxygen sensor response monitoring may be performed to issue a dither enable signal 121 to dither timing logic 122 to perform dither timing. The dither delay logic 120 can be operable to suspend the dither enable signal immediately when the monitor enable logic changes state to indicate that oxygen sensor response monitoring should be suspended.

The dither timing logic 122 is operable to control the timing of the dither applied to the AFR feedback control signal illustrated in FIG. 3. The dither timing logic 122 can include a counter 222 that counts to or from one or more predetermined values to effect the timing when the dither enable signal 121 is provided from the dither delay logic 120. In the example illustrated, a count can be determined in response to engine parameters such as an engine speed value 90 and an air flow rate 92 using a map 224 that receives the current engine speed 90 and air flow 92 values and outputs a value in response thereto. For example, if the dither timing logic 122 includes a count up timer, the value output by the map could be a threshold count value which is fed to a comparator 226 that determines when the counter 222 has reached that count. The comparator 226 can then be operable to output a timing signal 123 and to reset the counter 222 so that the counter 222 can be operable to time the next dither timing.

As a result, the dither timing logic 122 is operable to output a series of timing signals 123 to dither amplitude logic 124 to determine a timing for a change in the AFR feedback control signal.

The dither amplitude logic 124 is operable to determine a dither feedback amplitude ($\Delta$FB) for each change in the target AFR feedback control signal shown in FIG. 3.

In the example shown in FIG. 6, the dither amplitude logic 124 comprises first and second maps 232 and 234 for generating alternate lean and rich dither feedback amplitude values, respectively. A switch 236 is responsive to the timing signals 123 to alternate, or switch, between the lean and rich dither feedback amplitude ($\Delta$FB) values output by the first and second maps 232 and 234. In other words, the switch 236 switches between the outputs of the first and second maps 232 and 234 each time the comparator 226 of the dither timing logic 122 outputs a signal indicating that the counter 122 has reached the count value indicated by the map 224. The lean and rich dither amplitude values output by the first and second maps 232 and 234 are, in the present example, dependent upon the current engine speed 90 and air flow 92 values. However, in another example the maps 232 and 234 could be dispensed with and fixed values used instead. The output of the dither amplitude logic is the dither feedback amplitude (ΔFB) 126.

Figure 7:
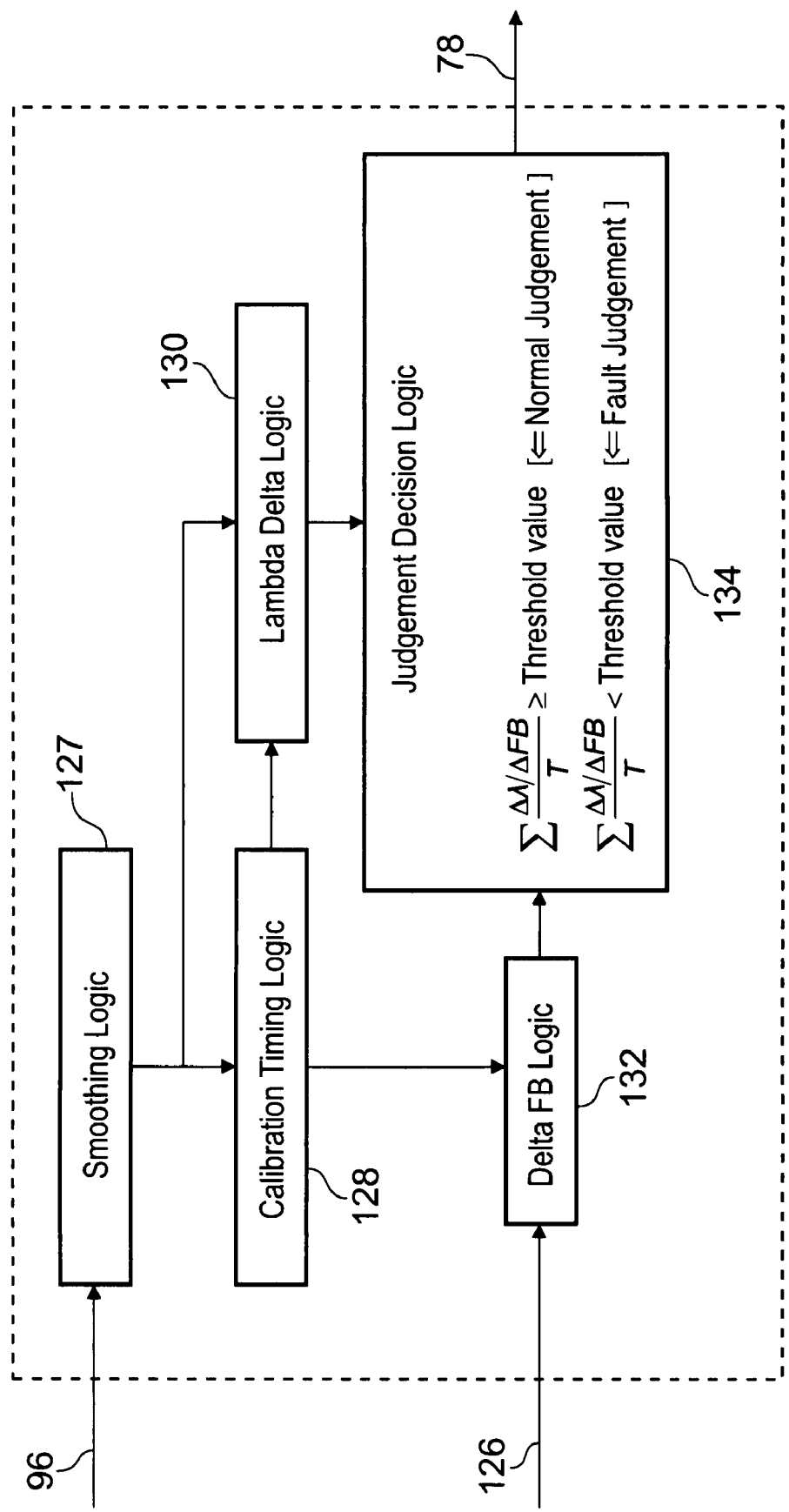
FIG. 7 is a schematic block diagram of example judgment logic.

FIG. 7 illustrates example judgment logic 76. The judgment logic 76 is operable to perform the judgment of the delta lambda values and the dither feedback values as described with reference to FIG. 3.

The judgment logic 76 receives the lambda signal 96 from the oxygen sensor and includes smoothing logic 127 to smooth that signal. Calibration timing logic 128 is operable to determine a measurement timing for measuring a change in lambda values over time. Lambda delta logic 130 is operable to sample the smoothed lambda signal to determine successive delta lambda values over successive timing periods determined by the calibration timing logic 128. Delta FB calculation logic 132 is operable to sample the dither amplitude values 126 and to generate successive delta feedback values at successive timings determined by the calibration timing logic 128.

Judgment decision logic 134 receives successive delta lambda values (Δλ) from the lambda delta logic 130 and the delta feedback (ΔFB) values from the delta FB calculation logic 132 and to compute the following relation:

$$\sum \frac{\Delta\lambda/\Delta FB}{T}$$

The judgment decision logic 134 is operable to compare the relation above to a threshold value as described with reference to FIG. 3. The oxygen sensor is determined to be operating correctly if the sum of a set of results for the change in the lambda values from the oxygen sensor divided by the change in feedback amplitude over a predetermined time is greater than or equal to a threshold value, that is:

$$\sum \frac{\Delta\lambda/\Delta FB}{T} \geq Thesholdvalue$$

The oxygen sensor is determined to have a slow response if the sum of a set of results for the change in the lambda values from the oxygen sensor divided by the change in feedback amplitude over a predetermined time is less than the threshold value, that is:

$$\sum \frac{\Delta\lambda/\Delta FB}{T} < Thesholdvalue$$

If the oxygen sensor is determined to have a slow response, then a malfunction signal is output at 78 that can cause the ECU to illuminate a malfunction indicator lamp (MIL).

Figure 8:
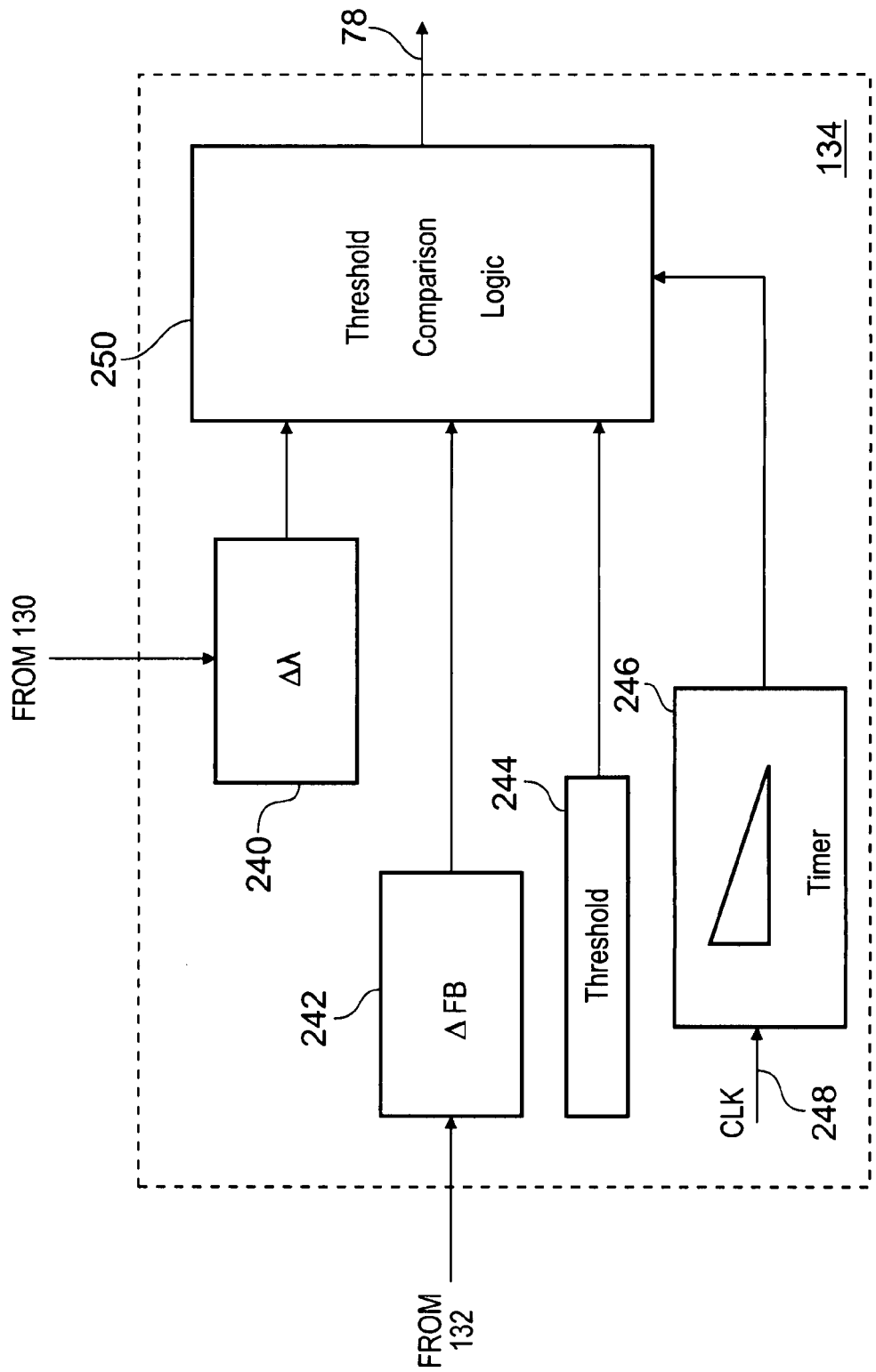
FIG. 8 is a schematic block diagram of example judgment decision logic.

FIG. 8 illustrates an example judgment decision logic 134. The judgment decision logic includes storage 240 for storing successive delta lambda values output by the lambda delta logic 130 and storage 242 for storing successive delta feedback values output by the delta FB logic 132. Storage is also provided for a threshold value 224. Judgment timing logic 246 is responsive to a clock 248 to time successive judgment periods for computing the relation below, and for comparing the result to the threshold value:

$$\sum \frac{\Delta\lambda/\Delta FB}{T}$$

The threshold comparison logic 250 is operable to compute the relation above from the stored delta lambda values and the stored delta feedback values from the storage 240 and 242, respectively, and to compare the result to the threshold value in storage 244 in response to a timing signal from the judgment timing logic 246.

The threshold comparison logic 250 is operable to output a first signal value at 78 indicating that the oxygen sensor is judged to be operating correctly if the sum of a set of results for the change in the lambda values from the oxygen sensor divided by the change in feedback amplitude over a predetermined time is greater than or equal to a threshold value, that is:

$$\sum \frac{\Delta\lambda/\Delta FB}{T} \geq Thesholdvalue$$

The threshold comparison logic 250 is operable to output a second signal value at 78 indicating that the oxygen sensor is judged to have a slow response if the sum of a set of results for the change in the lambda values from the oxygen sensor divided by the change in feedback amplitude over a predetermined time is less than the threshold value, that is:

$$\sum \frac{\Delta\lambda/\Delta FB}{T} < Thesholdvalue$$

If the oxygen sensor is determined to have a slow response, then the second signal value output at 78 is deemed to be a malfunction signal that can cause the ECU to illuminate a malfunction indicator lamp (MIL).

Figure 9:
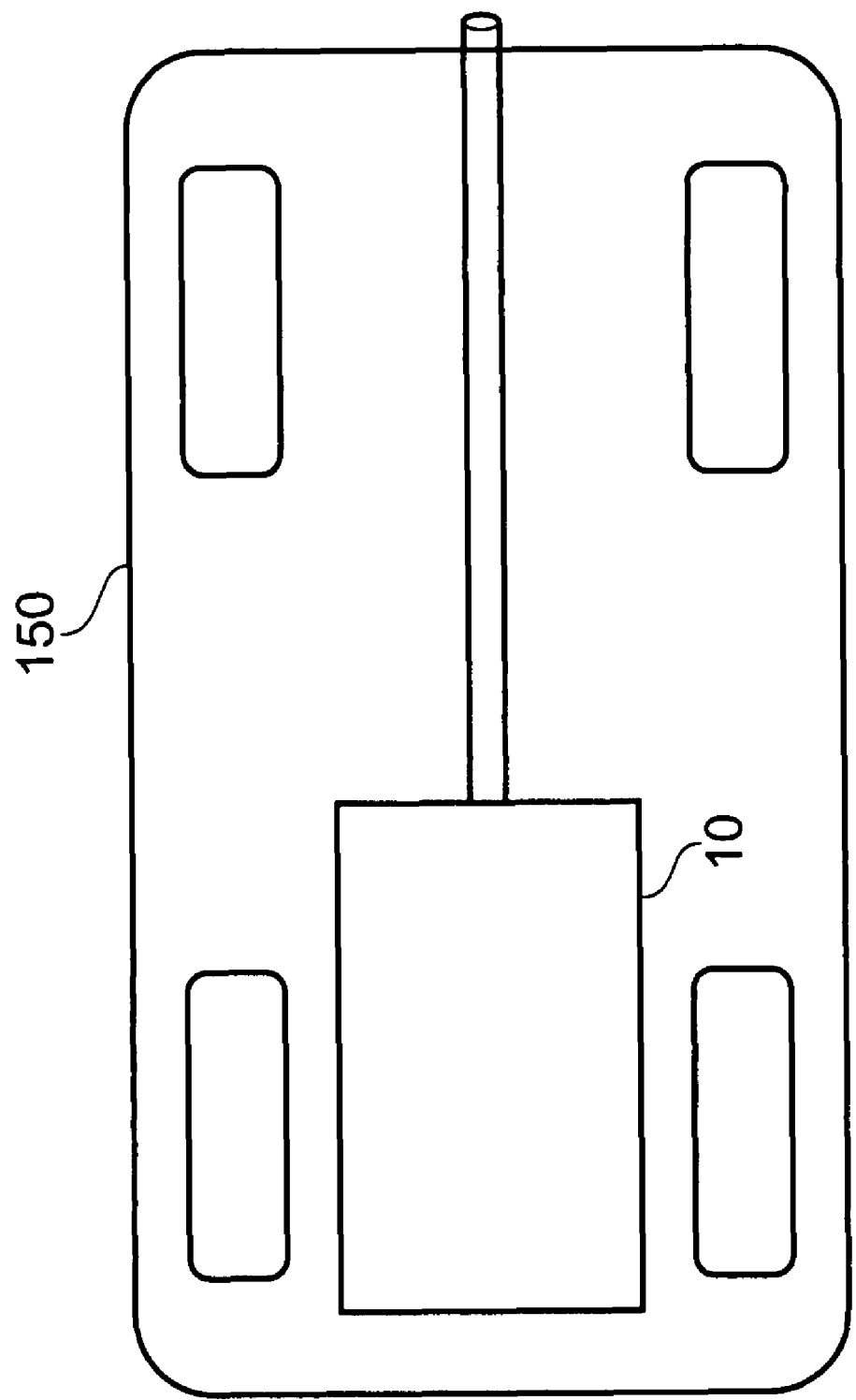
FIG. 9 is a schematic representation of a vehicle.

FIG. 9 is a schematic representation of a vehicle 150 including the engine system 10 described hereinabove.

There has been described a monitor and a method of monitoring the operation of an oxygen sensor of an internal combustion engine of a motor vehicle to detect a slow response of the oxygen sensor as indicative of an oxygen sensor fault, wherein the monitoring is temporarily suspended in response to a brake operation transition of a braking system of the vehicle.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A sensor malfunction monitor having a configuration to monitor the response of an oxygen sensor of an internal combustion engine of a motor vehicle to detect a slow response of the oxygen sensor as indicative of an oxygen sensor fault, the sensor malfunction monitor comprising entry condition logic having a configuration to temporarily suspend the oxygen sensor response monitoring in response to a brake operation transition of a braking system of the vehicle.

2. The sensor malfunction monitor of claim 1, wherein brake operation transition is at least one of brake activation and brake deactivation.

3. The sensor malfunction monitor of claim 1, wherein the entry condition logic comprises a brake signal transition detector logic responsive to a transition in a brake signal that has a first state when the braking system of the vehicle is active, and a second value when the braking system of the vehicle is brake is inactive, the entry condition logic being operable temporarily to suspend the oxygen sensor response monitoring in response the brake signal transition detection logic detecting a transition of the brake signal between states.

4. The sensor malfunction monitor of claim 3, wherein the brake signal is generated in response to at least one of a brake pedal position and a brake fluid pressure signal.

5. A sensor malfunction monitor operable to monitor the response of an oxygen sensor of an internal combustion engine of a motor vehicle to detect a slow response of the oxygen sensor as indicative of an oxygen sensor fault, the sensor malfunction monitor comprising entry condition logic operable temporarily to suspend the oxygen sensor response monitoring in response to a brake operation transition of a braking system of the vehicle; wherein:
 the entry condition logic comprises a brake signal transition detector logic responsive to a transition in a brake signal that has a first state when the braking system of the vehicle is active, and a second value when the braking system of the vehicle is brake is inactive, the entry condition logic being operable temporarily to suspend the oxygen sensor response monitoring in response the brake signal transition detection logic detecting a transition of the brake signal between states, and
 the entry condition logic comprises timing logic responsive to the brake signal transition detector logic and operable to cause the oxygen sensor response monitoring to be suspended for a predetermined time in response to detecting a brake operation transition of the braking system of the vehicle.

6. The sensor malfunction monitor of claim 5, wherein the timing logic is operable to suspend a permission signal for a predetermined time to cause the oxygen sensor response monitoring to be suspended for the predetermined time.

7. The sensor malfunction monitor of claim 1, wherein the oxygen sensor is a UHEGO sensor.

8. An engine management system for an internal combustion engine of a motor vehicle, the engine management system comprising a sensor malfunction monitor having a configuration to monitor the response of an oxygen sensor of the internal combustion engine to detect a slow response of the oxygen sensor as indicative of an oxygen sensor fault, the sensor malfunction monitor comprising entry condition logic having a configuration to temporarily suspend the oxygen sensor response monitoring in response to a brake operation transition of a braking system of the vehicle.

9. A vehicle comprising:
 an internal combustion engine,
 an exhaust system, an oxygen sensor in the exhaust system, a braking system, and
 a sensor malfunction monitor having a configuration to monitor the response of the oxygen sensor to detect a slow response of the oxygen sensor as indicative of an oxygen sensor fault, the sensor malfunction monitor comprising entry condition logic having a configuration to temporarily suspend the oxygen sensor response monitoring in response to a brake operation transition of the braking system.

10. A method of monitoring the operation of an oxygen sensor of an internal combustion engine of a motor vehicle to detect a slow response of the oxygen sensor as indicative of an oxygen sensor fault, the method comprising temporarily suspending the oxygen sensor response monitoring in response to a brake operation transition of a braking system of the vehicle.

11. The method of claim 10, wherein brake operation transition is at least one of brake activation and brake deactivation.

12. The method of claim 11, wherein a brake signal has a first state when the braking system of the vehicle is active and a second value when the braking system of the vehicle is brake is inactive, the method comprising temporarily suspending the oxygen sensor response monitoring in response to detecting a transition of the brake signal between states.

13. The method of claim 12, comprising generating the brake signal in response to at least one of a brake pedal position and a brake fluid pressure signal.

14. The method of claim 12, comprising suspending the oxygen sensor response monitoring for a predetermined time in response to detecting a brake operation transition of the braking system of the vehicle.

15. The method of claim 14, comprising suspending a permission signal for a predetermined time to cause the oxygen sensor response monitoring to be suspended for the predetermined time.

16. The method of claim 10, wherein the oxygen sensor is a UHEGO sensor.

17. A machine readable storage medium tangibly storing instructions which upon execution by a machine performs a method of monitoring the operation of an oxygen sensor of an internal combustion engine of a motor vehicle to detect a slow response of the oxygen sensor as indicative of an oxygen sensor fault, the method comprising temporarily suspending the oxygen sensor response monitoring in response to a brake operation transition of a braking system of the vehicle.

18. The machine readable storage medium of claim 17, wherein brake operation transition is at least one of brake activation and brake deactivation.

19. The machine readable storage medium of claim 18, wherein a brake signal has a first state when the braking system of the vehicle is active and a second value when the braking system of the vehicle is brake is inactive, and the method comprises temporarily suspending the oxygen sensor response monitoring in response to detecting a transition of the brake signal between states.

20. The machine readable storage medium of claim 19, wherein the method further comprises generating the brake signal in response to at least one of a brake pedal position and a brake fluid pressure signal.

21. The machine readable storage medium of claim 19, wherein the method further comprises suspending the oxygen sensor response monitoring for a predetermined time in response to detecting a brake operation transition of the braking system of the vehicle.

22. The machine readable storage medium of claim 21, wherein the method further comprises suspending a permission signal for a predetermined time to cause the oxygen sensor response monitoring to be suspended for the predetermined time.

23. The machine readable storage medium of claim 17, wherein the oxygen sensor is a UHEGO sensor.

* * * * *